(12) United States Patent
Army

(10) Patent No.: US 9,527,594 B2
(45) Date of Patent: Dec. 27, 2016

(54) CONDENSER WITH RECIRCULATION AIR MIXER

(75) Inventor: Donald E. Army, Enfield, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 78 days.

(21) Appl. No.: 13/454,213

(22) Filed: Apr. 24, 2012

(65) Prior Publication Data
US 2013/0277009 A1   Oct. 24, 2013

(51) Int. Cl.
*F25D 9/00* (2006.01)
*B64D 13/06* (2006.01)

(52) U.S. Cl.
CPC ....... *B64D 13/06* (2013.01); *B64D 2013/0688* (2013.01); *Y02T 50/44* (2013.01)

(58) Field of Classification Search
CPC . B64D 13/05; B64D 1013/0688; Y02T 50/44; B01F 2005/0045; B01F 2005/0438
USPC .............. 62/401, 402, 515, 86; 454/305, 76; 366/163.2, 167.1, 173.1, 173.2
See application file for complete search history.

(56) References Cited

U.S. PATENT DOCUMENTS

| 3,080,728 A | * | 3/1963 | Groves | B64D 13/06 62/133 |
|---|---|---|---|---|
| 3,371,618 A | * | 3/1968 | Chambers | F04F 5/467 417/163 |
| 4,142,365 A | * | 3/1979 | Sargisson et al. | 60/204 |
| 4,658,595 A |   | 4/1987 | Shimada et al. | |
| 4,829,775 A | * | 5/1989 | Defrancesco | 62/90 |
| 5,058,390 A |   | 10/1991 | Sindermann et al. | |
| 5,086,622 A | * | 2/1992 | Warner | B64D 13/06 62/172 |
| 5,133,194 A | * | 7/1992 | Army, Jr. | B64D 13/00 415/117 |
| 5,173,258 A |   | 12/1992 | Childers | |
| 5,230,656 A | * | 7/1993 | Paterson | F24F 13/26 239/590.5 |
| 5,704,218 A | * | 1/1998 | Christians et al. | 62/172 |
| 6,178,742 B1 | * | 1/2001 | Guyonnet | F02K 1/383 239/265.17 |
| 6,189,324 B1 | * | 2/2001 | Williams | B64D 13/06 62/172 |
| 6,381,969 B1 | * | 5/2002 | Afeiche | B64D 13/06 62/87 |

(Continued)

FOREIGN PATENT DOCUMENTS

JP    56061532 A * 5/1981

*Primary Examiner* — Len Tran
*Assistant Examiner* — Kun Kai Ma
(74) *Attorney, Agent, or Firm* — Kinney & Lange, P.A.

(57) ABSTRACT

An apparatus for use with an aircraft air conditioning machine to provide conditioned air to an aircraft cabin includes a recirculation air mixer to mix recirculation air and cold air from a turbine in the air conditioning machine as mixed air, the recirculation air mixer including a cold inlet, a plenum, a recirculation air inlet connected to an annulus and a plurality of injectors for injecting the recirculation air from the annulus into the plenum; and a condenser connected to the recirculation air mixer, the condenser including an inlet to receive air from a heat exchanger, a chamber where air from the recirculation air mixer enters to condense the air received through the inlet from the heat exchanger, an outlet for transferring the condensed air to the turbine, and an outlet for transferring conditioned air to the aircraft cabin.

21 Claims, 4 Drawing Sheets

(56) References Cited

U.S. PATENT DOCUMENTS

| | | | |
|---|---|---|---|
| 6,526,775 B1* | 3/2003 | Asfia | B64D 13/06 |
| | | | 62/401 |
| 6,658,881 B1 | 12/2003 | Plattner | |
| 6,663,044 B1 | 12/2003 | Munoz et al. | |
| 6,681,592 B1 | 1/2004 | Lents et al. | |
| 6,817,575 B1 | 11/2004 | Munoz et al. | |
| 6,948,331 B1 | 9/2005 | Ho | |
| 7,000,425 B2* | 2/2006 | Army, Jr. | B64D 13/06 |
| | | | 137/595 |
| 7,607,318 B2 | 10/2009 | Lui et al. | |
| 2001/0043888 A1* | 11/2001 | Ito | B01J 8/1827 |
| | | | 422/140 |
| 2002/0121103 A1* | 9/2002 | Udobot | B64D 13/06 |
| | | | 62/402 |
| 2005/0061019 A1* | 3/2005 | McColgan | B64D 13/00 |
| | | | 62/402 |
| 2005/0061913 A1* | 3/2005 | McColgan et al. | 244/118.5 |
| 2006/0059942 A1* | 3/2006 | McAuliffe | B64D 13/06 |
| | | | 62/402 |
| 2006/0213180 A1* | 9/2006 | Koshoffer | 60/226.1 |
| 2008/0110193 A1* | 5/2008 | Jonqueres | B64D 13/06 |
| | | | 62/331 |
| 2008/0210816 A1* | 9/2008 | Feisthammel | B01F 3/02 |
| | | | 244/118.5 |
| 2010/0190429 A1 | 7/2010 | Dage | |
| 2011/0167787 A1* | 7/2011 | Herndon | 60/204 |
| 2013/0067920 A1* | 3/2013 | Fox | F23R 3/14 |
| | | | 60/738 |

\* cited by examiner

CONDENSER WITH RECIRCULATION AIR MIXER

BACKGROUND

This invention relates generally to environmental control systems for an aircraft, and specifically to air conditioner systems.

A typical environmental control system for an aircraft includes an air conditioning pack mounted to the outside of the pressure vessel of the aircraft. Pressurized air, such as bleed air from the engine, is provided and processed by going through primary and secondary heat exchangers. The output air from the air cycle machine is typically subfreezing air with moisture, ice or snow mixed in it. The output then goes through a duct to a condenser to flow through the condenser before it flows to the aircraft cabin. Sometimes heat is added to the system to prevent freezing and blockage within the system.

SUMMARY

An apparatus for use with an aircraft air conditioning machine to provide conditioned air to an aircraft cabin includes a recirculation air mixer to mix recirculation air and cold air from a turbine in the air conditioning machine as mixed air, the recirculation air mixer including a cold inlet, a plenum, a recirculation air inlet connected to an annulus and a plurality of injectors for injecting the recirculation air from the annulus into the plenum; and a condenser connected to the recirculation air mixer, the condenser including an inlet to receive air from a heat exchanger, a chamber where air from the recirculation air mixer enters to condense the air received through the inlet from the heat exchanger, an outlet for transferring the condensed air to the turbine, and an outlet for transferring conditioned air to the aircraft cabin.

A method of mixing air for use in an aircraft cabin includes condensing air through a condenser to remove moisture from the air; expanding the condensed air through a turbine to cool the air; mixing the expanded air flowing axially into a recirculation air mixer with recirculation air from the cabin flowing radially into the recirculation air mixer.

DETAILED DESCRIPTION

Figure 1A:
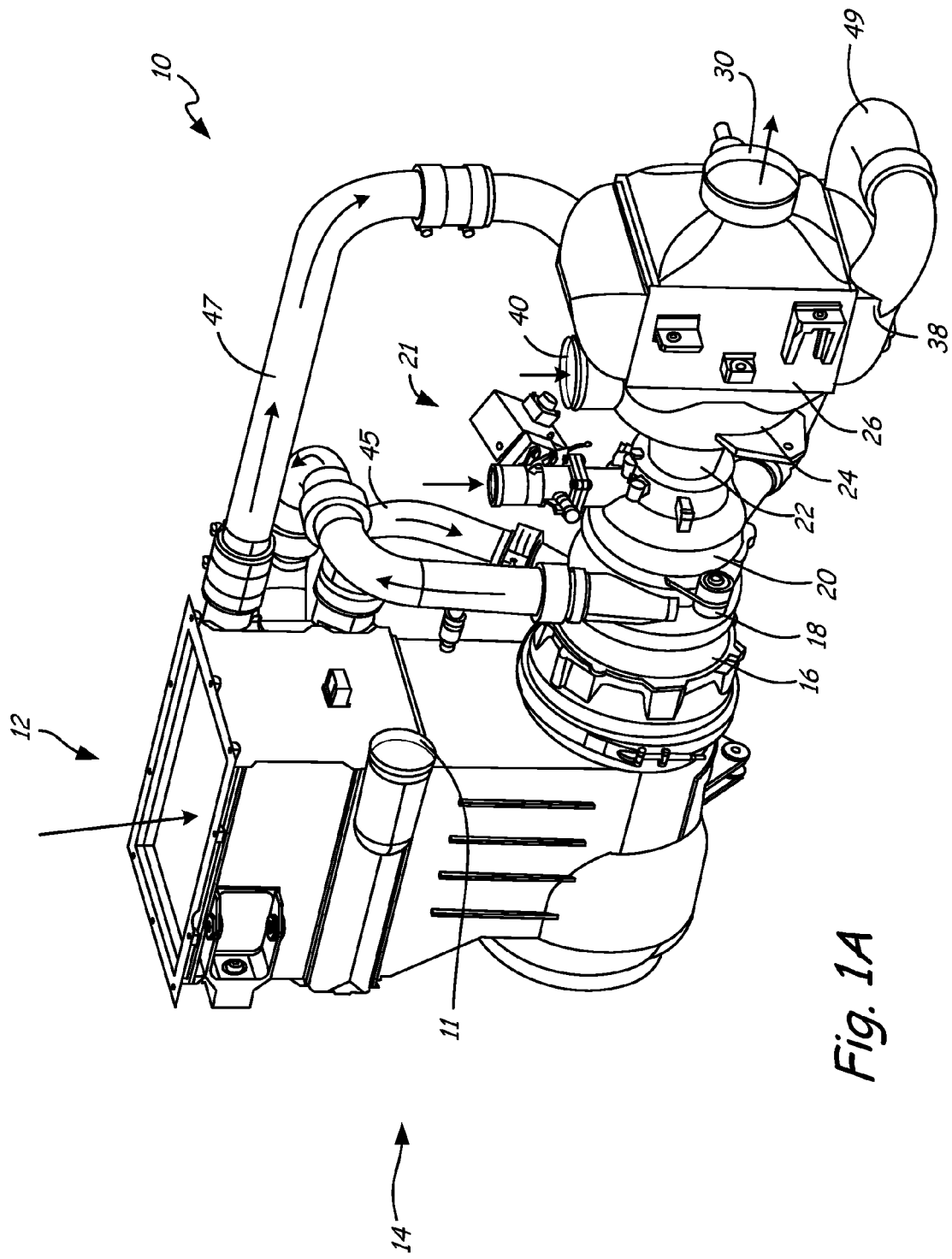
FIG. 1A shows a perspective view of an air conditioning machine.
Figure 1B:
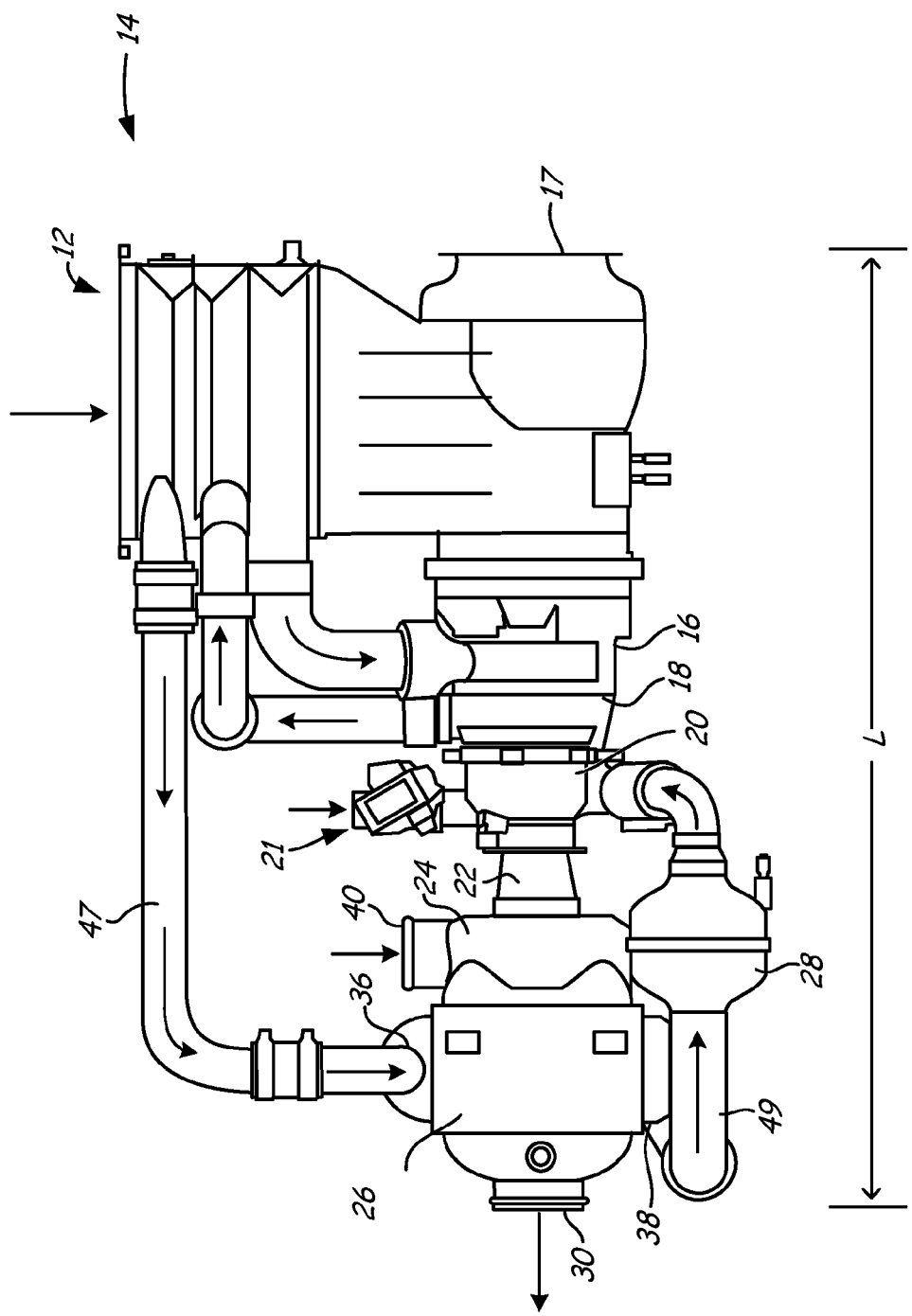
FIG. 1B shows a plan view of the air conditioning machine of FIG. 1A.

FIG. 1A shows a perspective view of air conditioning machine 10, and FIG. 1B shows a plan view of air conditioning machine 10. Air conditioning machine 10 includes hot air inlet 11, ram air inlet 12, dual heat exchanger 14, ram air fan 16 with ram air outlet 17, compressor 18, turbine 20, turbine bypass valve 21, turbine diffuser cone 22, recirculation air mixer 24, condenser 26, water collector 28 and outlet 30. Dual heat exchanger 14 includes a primary heat exchanger and a secondary heat exchanger in series. Condenser 26 includes inlet 36 and outlet 38. Recirculation air mixer 24 includes recirculation air inlet 40 and cold air inlet 42. Dimension L is shown as the length of air conditioning machine, and can be about 42 inches (about 1067 mm). Arrows show flow direction through ducts in machine 10.

Ram air fan 16 connects to dual heat exchanger 14. Dual heat exchanger 14 connects to compressor 18 through duct 45 connecting to primary heat exchanger, and connects to condenser 26 through duct 47 connecting to secondary heat exchanger. Condenser connects to turbine 20 through duct 49, which includes water collector 28. Turbine 20 connects to turbine diffuser cone 22, which then connects to recirculation air mixer 24, and through condenser 26 to outlet 30.

Air conditioning machine 10 can be mounted to the pressure vessel of an aircraft and works to supply conditioned air to the aircraft cabin at the proper pressure and temperature. Dual heat exchanger 14 receives compressed air from an engine at inlet 11. Typically this air is bled off the engine and compressed, having gone through regulating valves to set the pressure. The bleed air goes into primary heat exchanger, where it is cooled using ram air fan 16. Ram air fan 16 typically draws ambient air from outside the aircraft into heat exchanger 14 to cool process flow air and then exhausts the cooling ram air through outlet 17. This ambient air acts to cool air entering primary heat exchanger. Primary heat exchanger can, in one example, cool air from about 400 degrees F. (204 degrees C. or 477 Kelvin ("K")) to about 200 degrees F. (93 degrees C. or 366 K). This cooled air is then sent to compressor 18 through duct 45, where it is compressed. A typical compression can be from about 45 psi (310 kPa) to about 80 psi (552 kPa) at 350 degrees F. (177 degrees C. or 450 K). Next air is transferred to secondary heat exchanger, which also uses ram air to cool the primary airflow further, for example, from about 350 degrees F. (177 degrees C. or 450 K) to about 150 degrees F. (66 degrees C. or 339 K). The process flow air then flows to condenser 26 through duct 47.

Condenser 26 condenses air by lowering the air temperature to a point where water condenses out of the airflow and into water collector 28. This cooling is done by subjecting the flow to subfreezing air from turbine 20. Process air flows through condenser 26 outlet 38 to turbine 20. Turbine 20 expands the air to bring it to a subfreezing temperature. Turbine bypass valve 21 can be used to add heat to turbine 20 in some operating modes. Typically, valve 21 would be closed on warm days, when there is high humidity and large amounts of cooling from machine 10 are required.

The cold air from turbine 20 is directed through turbine diffuser cone 22 to recirculation air mixer 24 inlet 42 axially. Recirculation air mixer 24 also receives recirculated air from the aircraft cabin at inlet 40, directing it radially to mix with the process flow air, and then go through outlet 30 to be routed to aircraft cabin as mixed air.

Because the air coming out of turbine 20 is subfreezing, and can sometimes contain ice and snow, it has the propensity to clog condenser 26 at inlet to condenser 26 from mixer 24. This blockage can impede airflow in machine 10, resulting in machine 10 providing less than acceptable airflow to the aircraft cabin. The insertion of recirculation air (which is warmer air from the cabin) into recirculation air mixer 24 warms overall air temperature, preventing clogging of airflow.

Past systems included separate mixing and condenser systems. Past mixing systems typically brought all flow in radially, resulting in the need for additional mixing space to get desired mixing results. This resulted in air conditioning machines which were 52 inches (11 mm) in length or more. By combining condenser 26 and recirculation air mixer 24 into one piece, and mixing air radially and axially, air conditioning machine 10 is able to provide air to the aircraft cabin using much less space. Air conditioning machine 10 is about 42 inches (1067 mm) in length, reducing the length of air conditioning machine 10 by about 20% compared to previous air conditioning machines. Weight of the overall machine is also reduced, saving money and space.

Figure 2A:
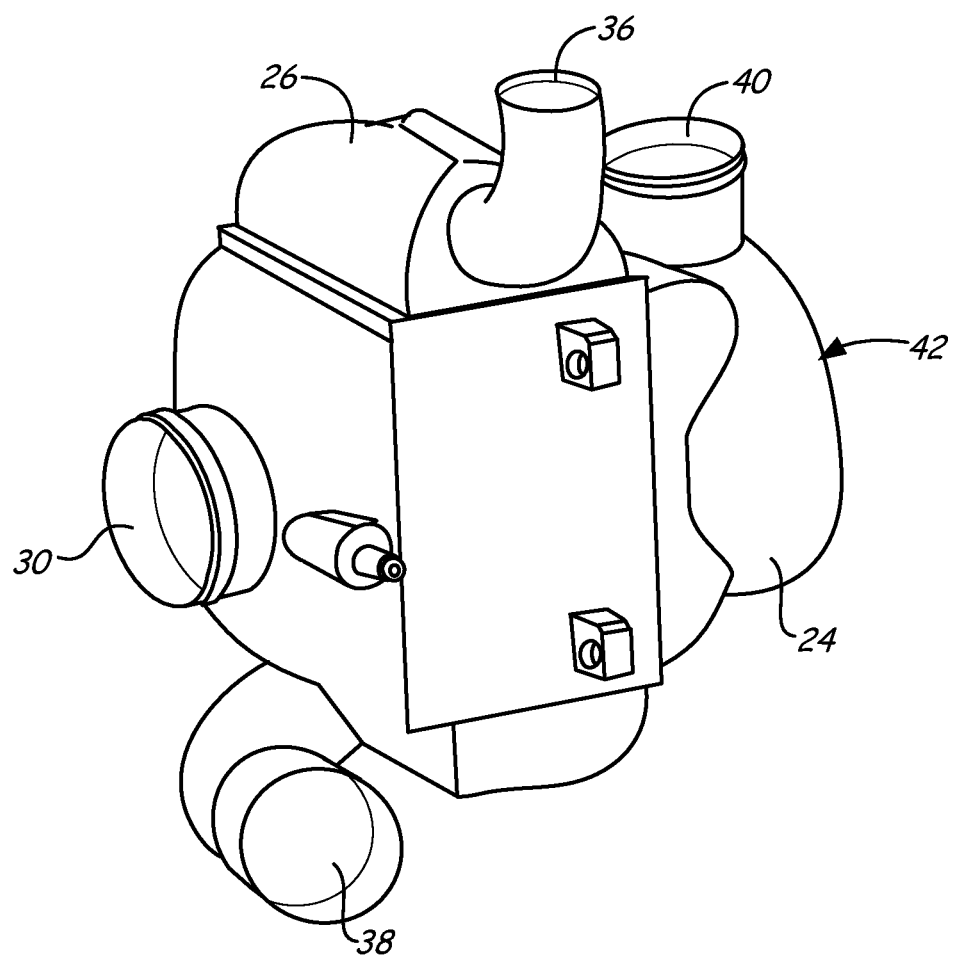
FIG. 2A shows a perspective view of a condenser with hybrid recirculation air mixer.
Figure 2B:
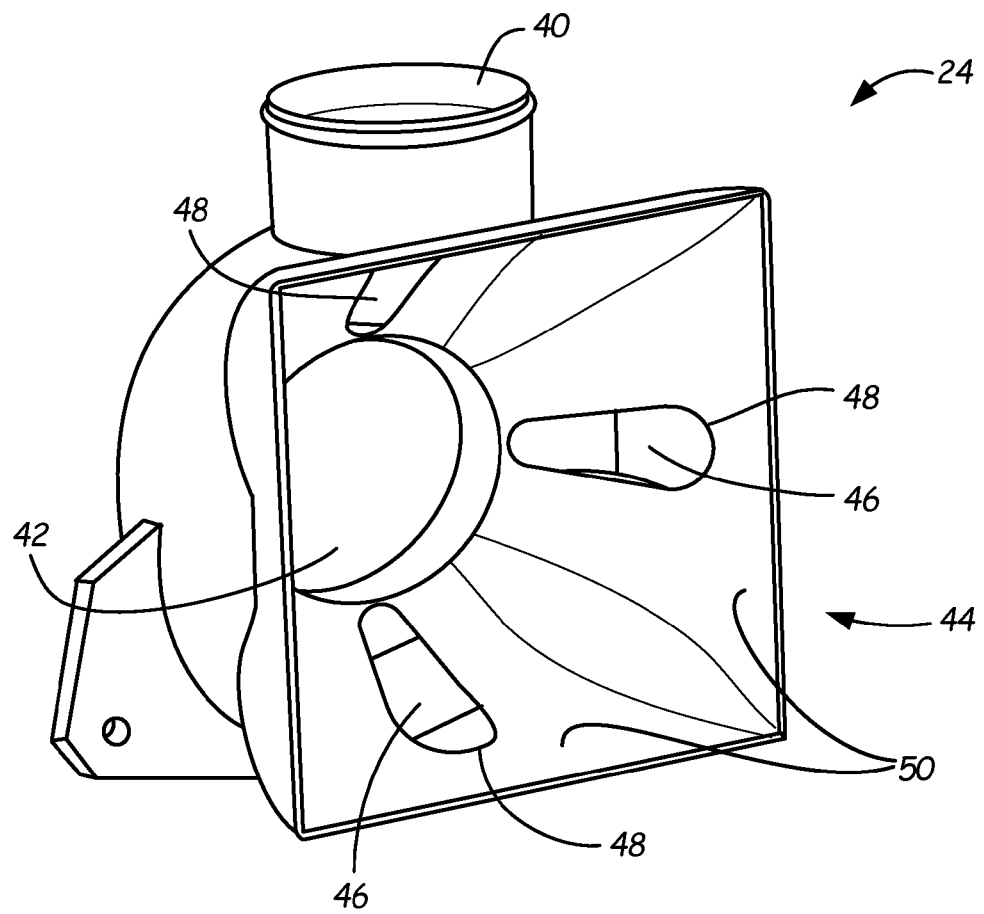
FIG. 2B shows a perspective view of the hybrid recirculation air mixer of FIG. 2A.

FIG. 2A shows a perspective view of condenser 26 and recirculation air mixer 24, and FIG. 2B shows a perspective view of recirculation air mixer 24. FIGS. 2A-2B include condenser 26 with hot inlet 36, hot outlet 38; recirculation air mixer 24 with recirculation air inlet 40, cold air inlet 42, plenum 44, annulus 46 and injectors 48.

Condenser 26 and recirculation air mixer 24 can be cast from aluminum, or and other any other metals that can withstand operating temperatures and stresses. Alternatively, they could be molded from carbon fiber, or suitable plastics. Condenser 26 and recirculation air mixer 24 can be welded or bolted together.

Recirculation air mixer 24 includes plenum 44, which is generally an expanding rectangular shape, growing symmetrically in size from the cold inlet until it connects with the condenser. Around plenum 44, there is an annulus 46, which connects to recirculation air inlet 40 and injectors 48. Inlet 40 receives recirculation air from the cabin and delivers it to annulus 46. Injectors 48 are located on each side of plenum 44, to inject air flowing in annulus 46 radially into plenum 44. Airflow from turbine 20 enters plenum 44 axially. In addition to injecting the recirculation air in at least a radial direction from annulus 46 into plenum 44, the plurality of injectors 48 can also inject air axially.

Condenser 26 includes a chamber which receives process air flow from secondary heat exchanger through inlet 36 and condenses air flow by lowering the temperature of process flow air through subjecting it to a subfreezing air flow from turbine 20 (see FIGS. 1A-1B). This causes vapor in the process air flow to condense, and any liquid is contained in water collector 28. As mentioned above, due to the cold temperatures and ice and snow mixed in air flow coming from turbine 20, inlet from mixer 24 to condenser 26 can freeze over, blocking air flow through air conditioning machine 10. Recirculation air mixer 24 helps to combat this by injecting warmer recirculation air radially and axially through injectors 48. This radial injection of warm air through injectors 48 promotes quick mixing with the cold air flowing axially through inlet 42 (from turbine 20). The quick mixing warms the temperature of air through the system to prevent ice buildup, and radial injectors 48 directs some warm air flow directly at inlet 36. This helps to prevent freezing on the face of heat exchanger 14, where the ice build-up commonly occurs. The teardrop shape of injectors 48 also promotes mixing to bring process flow air to a suitable temperature (in a smaller amount of space) for flowing through outlet 30 to the cabin.

Combining condenser 26 with recirculation air mixer 24 (with radial injectors) allows for a smaller overall air conditioning machine 10, while preventing ice build ups which impeded flow through machine 10 in past systems. Radial teardrop shaped injectors 48 promote better mixing in a smaller amount of space. Radial injectors 48 also promote the prevention of ice buildup at inlet of condenser 26 by directing some of warm recirculation air directly towards inlet. Combining condenser 26 with mixer 24 reduces the number of parts associated with air conditioning machine 10, which reduces the weight and volume required as compared to past system.

While recirculation air mixer 24 is shown in the embodiment above to include four teardrop shaped injectors 48, more or fewer injectors could be used. The shape of injectors 48 could also be varied to promote better mixing and prevent ice buildup.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An apparatus for use with an aircraft air conditioning machine to provide conditioned air to an aircraft cabin, the apparatus comprising:
   a recirculation air mixer to mix recirculation air and cold air from a turbine in the air conditioning machine as mixed air, the recirculation air mixer including a cold inlet, an annulus disposed around a plenum, a recirculation air inlet connected to the annulus, and a plurality of injectors for injecting the recirculation air at least radially from the annulus into the plenum; and
   a condenser connected to the recirculation air mixer, the condenser including an inlet to receive air from a heat exchanger, a chamber where air from the plenum of the recirculation air mixer enters to condense the air received through the inlet from the heat exchanger, an outlet for transferring the condensed air to the turbine, and an outlet for transferring conditioned air to the aircraft cabin;
   wherein the plenum comprises four walls, each wall including a surface tapered outwardly from the cold inlet, the tapered surfaces defining a fluid mixing space in the plenum having a rectangular shaped opening connected to the chamber of the condenser;
   the plurality of injectors comprises at least four injectors, with at least one injector formed through each tapered surface of the plenum; and
   at least one of the plurality of injectors is teardrop shaped.

2. The apparatus of claim 1, wherein the plurality of injectors comprises one teardrop shaped injector formed through each tapered surface of the plenum.

3. The apparatus of claim 1, wherein the plurality of injectors are adapted to inject the recirculation air both radially and axially from the annulus into the plenum.

4. The apparatus of claim 1, wherein the condenser and recirculation air mixer are one integral part.

5. The apparatus of claim 1, wherein the air conditioning machine comprises:
   a primary heat exchanger to cool the air received into the air conditioning system;
   a compressor connected to the primary heat exchanger to compress the air;
   a secondary heat exchanger to receive the compressed air and further cool the air and deliver the cooled air to the condenser; wherein
   the turbine is connected to the condenser to receive air from the condenser and expand the air and deliver cold air to the cold inlet of the mixer.

6. The apparatus of claim 5, and further comprising:
a ram air circuit for cooling the air in the primary and secondary heat exchangers.

7. The apparatus of claim 5, wherein the length of the air conditioning machine is less than or equal to 42 inches (1067 mm).

8. The apparatus of claim 1, wherein each wall surface is tapered outwardly from the cold inlet until the plenum connects to the condenser.

9. The apparatus of claim 1, wherein the annulus is disposed only around the plenum.

10. An air conditioning machine comprising:
a primary heat exchanger to cool the air received into the air conditioning system;
a compressor connected to the primary heat exchanger to compress the air;
a secondary heat exchanger to receive the compressed air and further cool the compressed air;
a condenser to receive the cooled air from the secondary heat exchanger and remove condensed water vapor;
a turbine connected to the condenser to receive condensed air from the condenser and expand the condensed air;
a recirculation air mixer to mix recirculation air with expanded air from the turbine, the mixer including a cold inlet aligned in the axial direction, an annulus disposed radially around a plenum, a recirculation air inlet connected to the annulus, and a plurality of injectors adapted to inject the recirculation air in at least a radial direction from the annulus into the plenum; and
an outlet to provide the mixed air for use in as conditioned air for an aircraft cabin;
wherein:
the plenum comprises four walls, each wall including a surface tapered outwardly from the cold inlet, the tapered surfaces defining a fluid mixing space in the plenum having a rectangular shaped opening connected to the chamber of the condenser;
the plurality of injectors comprises at least four injectors, with at least one injector formed through each tapered surface of the plenum; and
at least one of the plurality of injectors is teardrop shaped.

11. The air conditioning machine of claim 10, wherein the length of the system is less than or equal to 42 inches (1067 mm).

12. The air conditioning machine of claim 10, wherein the plurality of injectors comprises a single teardrop shaped injector formed in each tapered wall of the plenum.

13. The air conditioning machine of claim 10, wherein the plurality of injectors also injects the recirculation air axially.

14. The air conditioning machine of claim 10, and further comprising:
a water collector for collecting the moisture from the condenser and located in a duct connecting the condenser outlet to the turbine.

15. The air conditioning machine of claim 14, and further comprising:
a ram air fan to draw cooling air into and through the primary heat exchanger and the secondary heat exchanger to cool the air in the primary and secondary heat exchangers.

16. The air conditioning machine of claim 10, wherein each wall surface is tapered outwardly from the cold inlet until the plenum connects to the condenser.

17. The air conditioning machine of claim 10, wherein the annulus is disposed only around the plenum.

18. A method of conditioning air for use in an aircraft cabin, the method comprising:
condensing process air through a condenser to remove moisture from the air;
expanding the condensed air through a turbine and at least one heat exchanger to cool the air;
flowing the expanded and cooled air axially through a cold inlet of a recirculation air mixer, the cold inlet leading to a plenum comprising four walls, each wall including a surface tapered outwardly from the cold inlet, the tapered surfaces defining a fluid mixing space having a rectangular shaped opening connected to a chamber of the condenser;
flowing recirculation air into an annulus disposed radially around the plenum;
injecting the recirculation air at least radially into the plenum from the annulus through a plurality of injectors, the plurality of injectors comprising at least four injectors, with at least one injector formed through each tapered surface of the plenum;
in the fluid mixing space, mixing the expanded and cooled air with recirculation air from the cabin; and
flowing the mixed air into the chamber of the condenser through the rectangular shaped opening.

19. The method of claim 18, and further comprising:
injecting some of the recirculation air axially through the plurality of injectors into the plenum.

20. The method of claim 18, wherein each wall surface is tapered outwardly from the cold inlet until the plenum connects to the condenser.

21. The method of claim 18, wherein the annulus is disposed only around the plenum.

* * * * *